(12) United States Patent
Chun et al.

(10) Patent No.: US 8,300,665 B2
(45) Date of Patent: Oct. 30, 2012

(54) METHOD FOR TRANSMITTING CONTROL SIGNALS IN A WIRELESS COMMUNICATION SYSTEM

(75) Inventors: Jin Young Chun, Anyang-si (KR); Bin Chul Ihm, Anyang-si (KR); Wook Bong Lee, Anyang-si (KR); Moon Il Lee, Anyang-si (KR); Hyun Soo Ko, Anyang-si (KR)

(73) Assignee: LG Electronics Inc., Seoul (KR)

( * ) Notice: Subject to any disclaimer, the term of this patent is extended or adjusted under 35 U.S.C. 154(b) by 187 days.

(21) Appl. No.: 12/451,047

(22) PCT Filed: Apr. 23, 2008

(86) PCT No.: PCT/KR2008/002300
§ 371 (c)(1),
(2), (4) Date: Oct. 23, 2009

(87) PCT Pub. No.: WO2008/130190
PCT Pub. Date: Oct. 30, 2008

(65) Prior Publication Data
US 2010/0103886 A1     Apr. 29, 2010

(30) Foreign Application Priority Data

Apr. 24, 2007 (KR) .................. 10-2007-0039902
May 22, 2007 (KR) .................. 10-2007-0049709

(51) Int. Cl.
*H04J 13/00* (2006.01)
*H04J 3/02* (2006.01)

(52) U.S. Cl. ........................ 370/479; 370/537

(58) Field of Classification Search .......... 370/203–210, 370/329, 335–336, 342, 479, 491; 455/450, 455/509; 375/261
See application file for complete search history.

(56) References Cited

U.S. PATENT DOCUMENTS

| | | | |
|---|---|---|---|
| 7,586,834 B2 * | 9/2009 | Byun et al. | 370/208 |
| 7,630,356 B2 * | 12/2009 | Zhang et al. | 370/344 |
| 2003/0185242 A1 * | 10/2003 | Lee et al. | 370/491 |
| 2005/0232138 A1 | 10/2005 | Byun et al. | |
| 2005/0286402 A1 | 12/2005 | Byun et al. | |
| 2006/0171295 A1 * | 8/2006 | Ihm et al. | 370/208 |
| 2006/0227888 A1 * | 10/2006 | Khan | 375/260 |
| 2006/0262870 A1 * | 11/2006 | Khan | 375/260 |
| 2006/0286996 A1 * | 12/2006 | Julian et al. | 455/522 |
| 2007/0274217 A1 * | 11/2007 | Long et al. | 370/235 |
| 2008/0095106 A1 * | 4/2008 | Malladi et al. | 370/329 |

(Continued)

OTHER PUBLICATIONS

KDDI, NTT DoCoM; "CDMA based Multiplexing of ACK/NACK and CQI Control Information in E-UTRA Uplink.", R1-071707, 3GPP TSG RAN WG1 Meeting #48, St. Julians, Malta, Mar. 2007.
NTT DOCOM et al., "CDM based Multiplexing Method of Multiple ACK/NACK and CQI E-UTRA Uplink.", R1-062742, 3GPP TSG RAN WG1 Meeting #46, Seoul, Korea, Oct. 2006.

(Continued)

*Primary Examiner* — Habte Mered
(74) *Attorney, Agent, or Firm* — McKenna Long & Aldridge LLP (57) ABSTRACT

A method of transmitting control signals includes configuring a multiplexing indicator indicating that a plurality of control signals are multiplexed on a control channel, generating a multiplexed control signal by multiplexing a first control signal and a second control signal according to the multiplexing indicator and transmitting the multiplexed control signal on the control channel. Overhead due to control signaling can be reduced by transmitting a multiplexed control signal on a control channel.

9 Claims, 5 Drawing Sheets

U.S. PATENT DOCUMENTS

| | | |
|---|---|---|
| 2008/0165697 A1 | 7/2008 | Zeira et al. |
| 2008/0219370 A1* | 9/2008 | Onggosanusi et al. ....... 375/260 |
| 2008/0225792 A1 | 9/2008 | Naguib et al. |
| 2009/0046799 A1 | 2/2009 | Li et al. |
| 2010/0182961 A1 | 7/2010 | Kim et al. |

OTHER PUBLICATIONS

Mitsubishi Electric, "Further Evaluation of CQI feedback scheme.", Tdoc R1-070685, 3GPP TSG RAN WG1 #48. St. Louis, USA, Feb. 2007.

* cited by examiner

Fig. 8

METHOD FOR TRANSMITTING CONTROL SIGNALS IN A WIRELESS COMMUNICATION SYSTEM

This application claims the benefit of PCT/KR2008/002300 filed on Apr. 23, 2008, 2008 along with Korean Patent Application No. 10-2007-0039902 filed on Apr. 24, 2007 and Korean Patent Application No. 10-2007-0049709 filed on May 22, 2007, each of which are hereby incorporated herein by reference for all purposes in their entirety.

TECHNICAL FIELD

The present invention relates to wireless communication and, more particularly, to a method of transmitting control signals in a wireless communication system.

BACKGROUND ART

A next generation multimedia wireless communication system that has been actively researched is required to process not only voices but also images, packet data and the like.

Orthogonal frequency division multiplexing (OFDM) scheme is a multi-carrier modulation scheme for transmitting data by using a plurality of orthogonal subcarriers and is one of core technologies that have been in the spotlight in the next-generation multimedia wireless communication system. Orthogonal frequency division multiple access (OFDMA) is a multiple access scheme by combining the OFDM with a frequency division multiple access (FDMA), time division multiple access (TDMA) or code division multiple access (CDMA).

In general, control signals are transmitted from a base station to a mobile station or from a mobile station to a base station periodically or event-drivenly. The control signal refers to a signal relates to decoding of traffic data, scheduling of traffic data and feedback of channel condition. Hereinafter, downlink refers to transmission from the base station to the mobile station and uplink refers to transmission from the mobile station to the base station. An example of the uplink control signals is a channel quality indicator (CQI). In general, the mobile station transmits the CQI to the base station periodically in order to report channel quality to the base station.

There are various kinds of uplink control signals. In order to provide various communication services, the control signals are needed to frequently be exchanged between the base station and the mobile station. The exchange of the control signals is called control signaling. Frequent control signaling between the base station and the mobile station may reduce capacity of system since control signaling does not contribute to the increase of data rate. Further, as the control signaling is increased, the lifespan of the battery, that is one of the major design restrictions of a mobile station, may be shortened.

A method is sought for minimizing overhead due to the control signaling so as to increase the capacity.

DISCLOSURE OF INVENTION

Technical Problem

A method of transmitting control signals to reduce control signaling is provided.

A method of negotiating basic capability between a mobile station and a base station to reduce control signaling is also provided.

Technical Solution

In an aspect, a method of transmitting control signals in a wireless communication system is provided. The method includes configuring a multiplexing indicator indicating that a plurality of control signals are multiplexed on a control channel, generating a multiplexed control signal by multiplexing a first control signal and a second control signal according to the multiplexing indicator, and transmitting the multiplexed control signal on the control channel.

In another aspect, a method of enabling a mobile station to negotiate basic capability with a base station in a wireless communication system is provided. The method includes transmitting a basic capability request including a multiplexing indicator to the base station, the multiplexing indicator indicating that a plurality of control signals are multiplexed on a control channel, and receiving a basic capability response including the approval of the multiplexing indicator from the base station.

In still another aspect, a method of enabling a base station to negotiate basic capability supported by a mobile station in a wireless communication system is provided. The method includes receiving a basic capability request including a multiplexing indicator from the mobile station, the multiplexing indicator indicating that a plurality of control signals are multiplexed on a control channel, and transmitting a basic capability response including the approval of the multiplexing indicator to the mobile station.

Advantageous Effects

Overhead due to control signaling can be reduced by transmitting a multiplexed control signal on a control channel.

MODE FOR THE INVENTION

Figure 1:
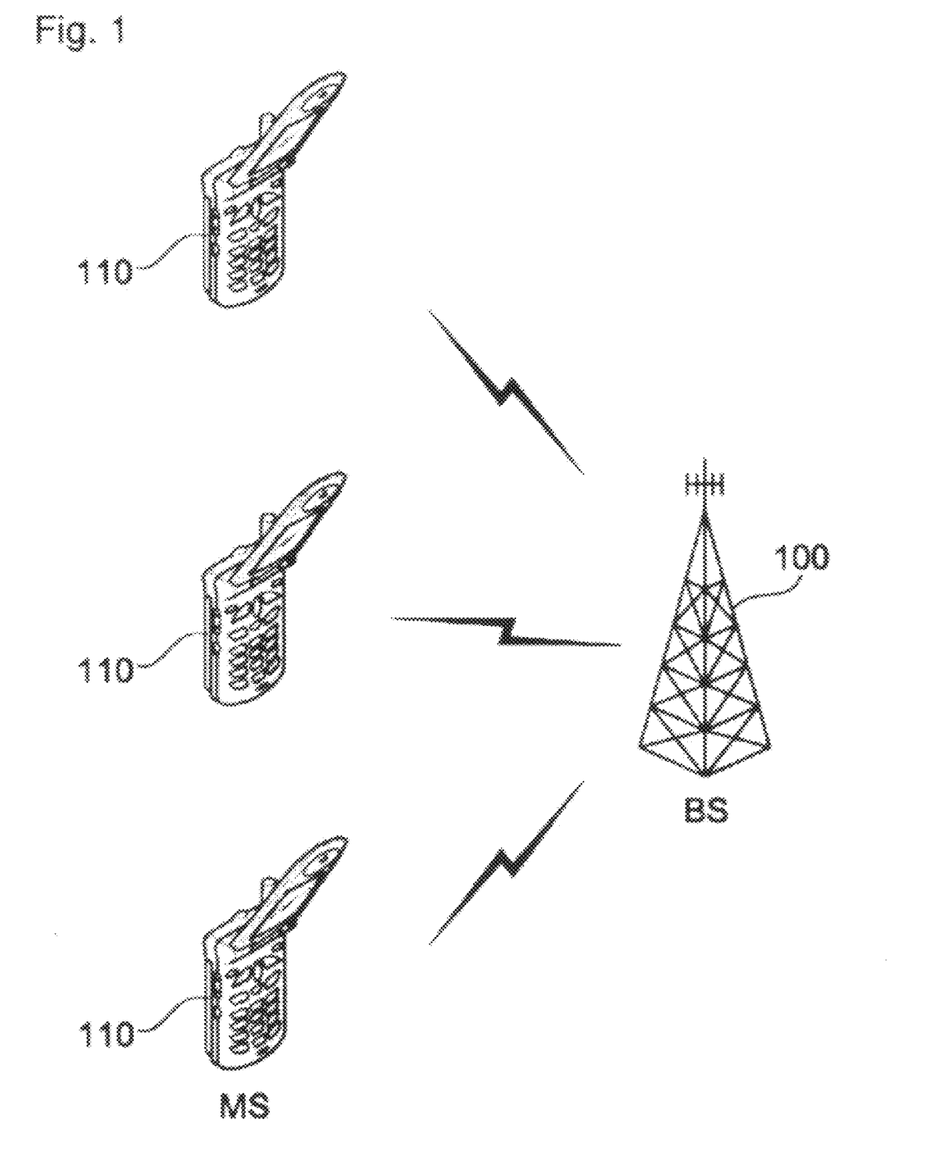
FIG. 1 is an exemplary view showing a wireless communication system.

FIG. 1 is an exemplary view showing a wireless communication system.

Referring to FIG. 1, a wireless communication system includes a base station (BS) 100 and a mobile station (MS) 110. The communication systems are widely deployed to provide a variety of communication services such as voice and packet data. The base station 100 generally refers to a fixed station communicating with the mobile station 110 and can also be referred to as another terminology, such as node-B, a base transceiver system (BTS) or an access point. The mobile station 110 can be fixed or mobile and can also be called another terminology, such as a user equipment (UE), a user terminal (UT), a subscriber station (SS) or a wireless device.

The base station 100 receives uplink data through a uplink channel. The uplink data may be control signals or user signals. The user signal refers to a signal to which user data is loaded and the control signal refers to a signal other than user data. The control signal can include a channel quality indicator (CQI), a ACK (Acknowledgement)/NACK (Not-Acknowledgement) signal for hybrid automatic repeat request (HARQ), and scheduling information such as radio resource allocation, power level control and synchronization information. Control signals are necessary for successful transmission of user signals between the base station 100 and the mobile station 110. For example, After receiving a CQI from the mobile station 110, the base station 100 can schedule the transmission format, the power level and the data rate of a user signal based on the CQI. The base station 100 processes a user signal based on the transmission format, power level and data rate, and transmits the user signal to the mobile station 110 through a downlink channel. The base station 100 allocates the best resources to the mobile station 110 based on the CQI, thereby increasing the data rate.

The mobile station 110 receives downlink data through the downlink channel. The downlink data includes control signals or user signals in a similar way as uplink data The downlink data can include a pilot for CQI measurement or a preamble for synchronization. The pilot is a signal known to both the base station 100 and the mobile station 110 and used to estimate channel for data modulation. The pilot is also called a reference signal. The mobile station 110 measures a CQI through the pilot. The mobile station 110 reports the measured CQI to the base station 100.

A wireless communication system can be OFDM/OFDMA based system. OFDM employs a plurality of orthogonal subcarriers. OFDM employs the orthogonality between inverse fast Fourier transform (IFFT) and fast Fourier transform (FFT). A transmitter performs IFFT on data and transmits the resulting data. A receiver performs FFT on a received signal and thus restores original data. A transmitter employs IFFT in order to combine a plurality of subcarriers. A receiver employs corresponding FFT in order to separate multiple subcarriers. Here, in the downlink direction, a transmitter can be a part of the base station 100 and a receiver can be a part of the mobile station 110. In the uplink direction, a transmitter can be a part of the mobile station 110 and a receiver can be a part of the base station 100.

Figure 2:
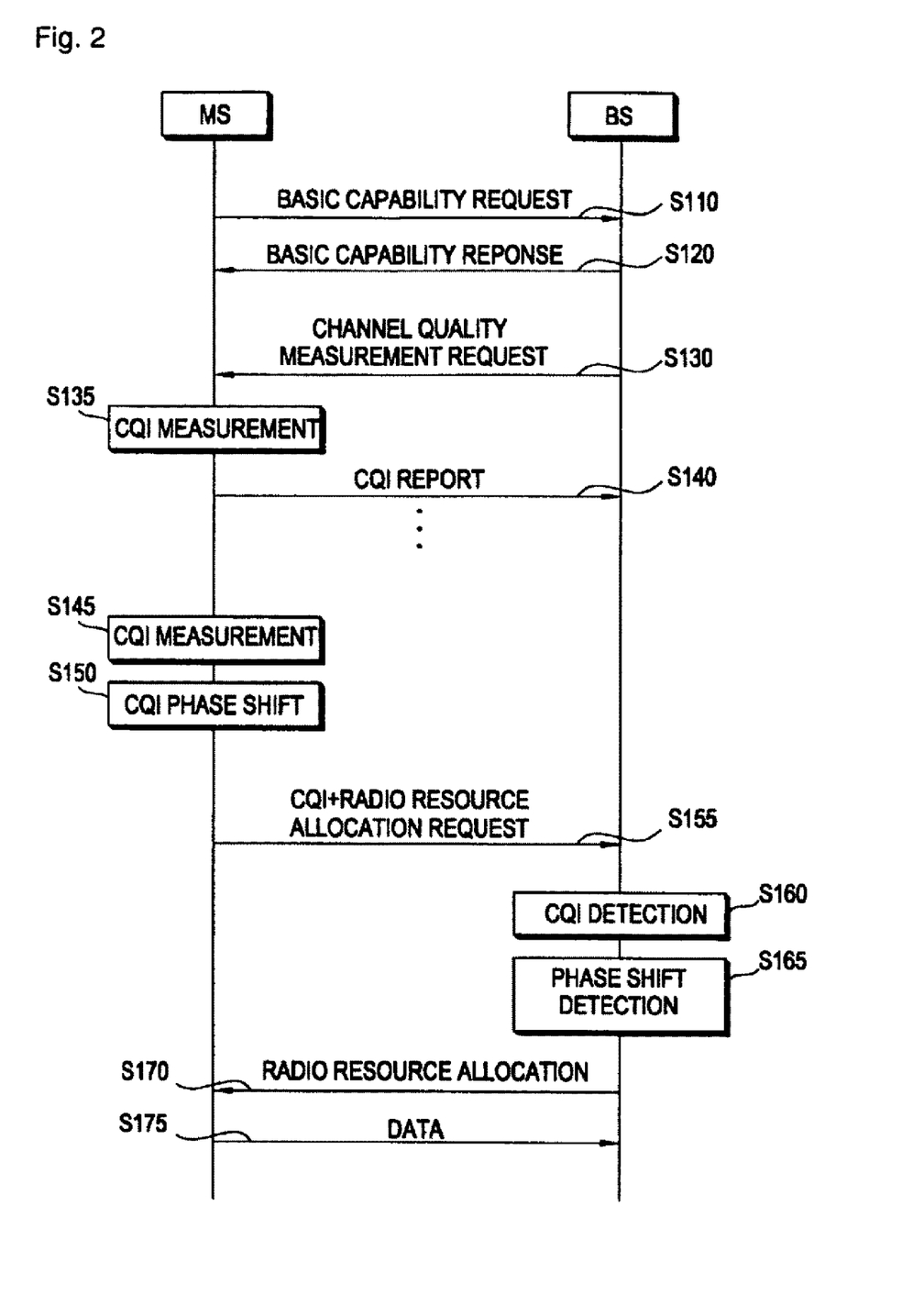
FIG. 2 is a flowchart illustrating a data transmission method in accordance with an embodiment of the present invention.

FIG. 2 is a flowchart illustrating a data transmission method in accordance with an embodiment of the present invention.

Referring to FIG. 2, a mobile station (MS) transmits a basic capability request to a base station (BS) (S110). The basic capability request includes information on capability that can be supported by the mobile station for efficient communication between the mobile station and the base station. The basic capability request includes information on bandwidth allocation support and physical parameters supported. The physical parameters can include various pieces of information about communication parameters, such as a transmission interval, a maximum transmit power, a current transmit power and an uplink control channel support of a mobile station. The information on the uplink control channel support indicates the type of a control channel supported in uplink transmission.

An example of the uplink control channel support can be shown as in the following Table 1. Here, it is assumed that when the value of a bit #n is '0', the corresponding contents are not supported and when the value of the bit #n is '1', the corresponding contents are supported. That is, when the value of the bit #n is '0' the corresponding contents become 'off' and when the value of the bit #n is '1' the corresponding contents become 'on'.

TABLE 1

| Bit | Contents |
| --- | --- |
| #0 | 3 bit-MIMO Fast-feedback |
| #1 | Enhanced FAST_FEEDBACK Under negotiation for SBC fast feedback, if enhanced feature is enabled, the SS should use only the enhanced fast-feedback channel in the CQICH allocation IE |
| #2 | UL ACK |
| #3 | Phase shifted BW request (multiplexing indicator) |
| #4 | UEP fast-feedback |
| #5 | A measurement report shall be performed on the last DL burst |
| #6 | Primary/Secondary FAST_FEEDBACK |
| #7 | DIUC-CQI Fast-feedback |

When the value of the bit #0 is '1', MIMO fast feedback of a 3-bit payload is supported. The fast feedback refers to faster uplink transmission than general uplink data. When the value of the bit #1 is '1', fast feedback of a 6-bit payload, which is improved compared with the 3-bit payload, is supported in CQI channel (CQICH) signaling. Here, the mobile station employs a fast feedback channel. When the value of the bit #2 is '1', an uplink ACK channel is supported. The bit #3 indicates a multiplexing indicator. The multiplexing indicator indicate that a plurality of control signals are multiplexed on a control channel. When the value of the bit #3 is '1', a radio resource allocation request using the phase shift of a control signal (Phase shifted BW request) is supported. When the value of the bit #4 is '1', unequal error protection (UEP) fast feedback is supported. In the UEP fast feedback, each payload bit is repeatedly transmitted according to a defined repetition ratio. When the value of the bit #5 is '1', a post-processing carrier-to-interference-and-noise ratio (CINR) measurement report on each spatial layer of a MIMO-supported mobile station is formed in the downlink burst (DL burst). When the value of the bit #6 is '1', primary/secondary fast feedbacks are supported. When the value of the bit #7 is '1', downlink interval usage code (DIUC)-CQI fast feedback is supported.

Another example of the uplink control channel support can be shown as in the following Table 2. The multiplexing indicator is located at the bit #7.

TABLE 2

| Bit | Contents |
| --- | --- |
| #0 | 3 bit-MIMO Fast-feedback |
| #1 | Enhanced FAST_FEEDBACK Under negotiation for SBC fast feedback, if enhanced feature is enabled, the SS should use only the enhanced fast-feedback channel in the CQICH allocation IE |
| #2 | UL ACK |
| #3 | Phase shifted BW request (multiplexing indicator) |
| #4 | UEP fast-feedback |
| #5 | A measurement report shall be performed on the last DL burst |
| #6 | Primary/Secondary FAST_FEEDBACK |
| #7 | Phase shifted BW request (multiplexing indicator) |

The value of the bit #3 can be set to '0' as if the contents are not specified. When the value of the bit #7 is '1', a radio resource allocation request using the phase shift of a control signal is supported. The contents of the remaining bits #0 to #2 and #4 to #6 are the same as those of Table 1. Table 1 and Table 2 are only illustrative, and the number and the contents of the bits #n can be changed in various ways. Further, the location of the multiplexing indicator can be changed in various ways.

The base station transmits a basic capability response to the mobile station (S120). The basic capability response is a response to the basic capability request and indicates capability applied to communication between the mobile station and the base station. A capability negotiation is performed between the mobile station and the base station through the basic capability request and the basic capability response. With respect to the capability transmitted as 'on' in the basic capability request, the capability can be transmitted as 'on' or 'off' in the basic capability response. The capability that is 'on' in both the basic capability request and the basic capability response is applied to communication between the mobile station and the base station.

In the capability negotiation between the mobile station and the base station, when the multiplexing indicator becomes 'on', that is, 'Phase shifted BW request' is applied, a CQI is phase-shifted to indicate the radio resource allocation request. In other words, assuming that the CQI is a first control signal and the radio resource allocation request is a second control signal, the second control signal is multiplexed in the first control signal. The first control signal can be a CQI, an ACK/NACK signal, and MIMO (multiple-input multiple-output) feedback information.

For example, when the 'Phase shifted BW request' becomes 'on', the ACK/NACK signal can be multiplexed in the CQI. That is, in the case where the multiplexing indicator represents 'Phase shifted ACK/NACK', when the multiplexing indicator becomes 'on', the ACK/NACK signal can be multiplexed in the CQI and then transmitted. In addition to the above, the first control signal and the second control signal can be applied by combining various control signals.

The base station requests channel quality measurement to the mobile station (S130). This channel quality measurement request can be carried out through a channel quality measurement request message. The channel quality measurement request message can include information about a period of CQI report and uplink radio resources for CQI report and the like.

The mobile station measures channel quality and thus constructs a CQI (S135). The CQI can be measured through a pilot, which is included in downlink data transmitted from the base station. Here, the CQI refers to information on channel state between the mobile station and the base station. The CQI can have a variety of forms such as the signal-to-interference plus noise ratio (SINR), the modulation and coding scheme (MCS) level, a data rate indicator or a received signal strength indicator.

The mobile station reports the CQI to the base station through a CQI channel (S140). The CQI channel is a channel through which the CQI is transmitted. The mobile station periodically reports the CQI to the base station according to a CQI measurement period included in the channel quality measurement request message. In response to a command from the base station, the mobile station periodically measures a CQI and reports the measured CQI to the base station.

For another CQI report, the mobile station measures channel quality at a proper time in order to construct a CQI (S145).

In order to request radio resource allocation, the mobile station shifts the phase of the CQI (S150). This is performed when 'Phase shifted BW request' of the bit #3 in Table 1 or the bit #7 in Table 2 is 'on' in the capability negotiation. The mobile station must be allocated uplink radio resources from the base station in order to transmit user signals through the uplink. While periodically reporting the CQI, the mobile station shifts the phase of the CQI and requests radio resource allocation from the base station. In other words, assuming that the CQI is a first control signal and the radio resource allocation request is a second control signal, the mobile station multiplexes the first control signal and the second control signal. The mobile station shifts the phase of the first control signal and multiplexes the second control signal with the first control signal. The phase-shifted first control signal becomes a multiplexed control signal. The multiplexing of control information is described later on.

The mobile station transmits the phase-shifted CQI through the CQI channel (S155). Although only the phase-shifted CQI is transmitted through the CQI channel, it can be seen that two control signals are transmitted through the CQI channel. The CQI channel carries an actual CQI value and radio resource allocation request based on the phase-shifted CQI.

The base station detects a CQI from the CQI channel (S160). A scheme for detecting the CQI from a CQI channel may employ a coherent detection or non-coherent detection scheme. The coherent detection scheme is a method of performing channel estimation using a pilot and then detecting a CQI. The non-coherent detection scheme is a method of detecting a CQI without channel estimation.

The base station detects whether the phase of a CQI has shifted (S165). If, as a result of the detection, the phase of the CQI has shifted, the base station determines that there is a radio resource allocation request from the mobile station. The detection of the phase shift may be varied depending on coherent detection and non-coherent detection, which is described later on.

The base station allocates radio resources to the mobile station according to the radio resource allocation request (S170).

The mobile station to which received an allocation of radio resources transmits uplink data using the radio resources (S175).

The mobile station transmits the phase-shifted CQI which is multiplexed with the radio resource allocation request and the CQI. An additional control channel for the radio resource allocation request is not needed. Control signaling can be reduced since multiple control signals are simultaneously transmitted on a control channel.

Multiplexing of control signals and detection of a multiplexed control signal in the base station are described below.

Figure 3:
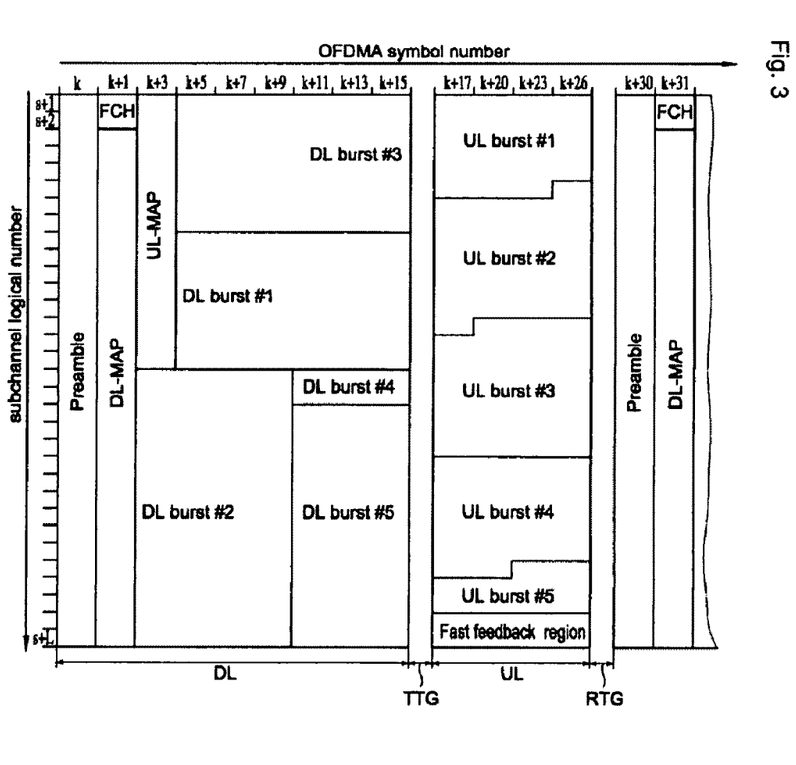
FIG. 3 shows an example of a frame configuration.

FIG. 3 shows an example of a frame configuration. A frame is a data sequence during a fixed time, which is used by physical specifications. This may be an OFDMA frame.

Referring to FIG. 3, a frame includes a downlink frame and an uplink frame. Time division duplex is a scheme in which uplink and downlink transmissions share the same frequency, but occur on different times. The downlink frame is earlier in time than the uplink frame. The downlink frame includes a preamble, a frame control header (FCH), a downlink (DL)-MAP, an uplink (UL)-MAP, and a downlink burst (DL burst) region. The uplink frame includes an uplink burst (UL burst) region.

A guard time for separating an uplink frame and a downlink frame is inserted into an intermediate portion of a frame (between the downlink frame and the uplink frame) and the last portion of the frame (subsequently to the uplink frame). A transmit/receive transition gap (TTG) is a gap between a downlink burst and a subsequent uplink burst. A receive/transmit transition gap (RTG) is a gap between an uplink burst and a subsequent downlink burst.

The preamble is used for initial synchronization, cell search, frequency offset, and channel estimation between a base station and a mobile station. The FCH includes information about the length of a DL-MAP message and a coding scheme of DL-MAP. The DL-MAP is a region where a DL- MAP message is transmitted. The DL-MAP message defines access to a downlink channel. The DL-MAP message includes a configuration change count of a downlink channel descriptor (DCD) and a base station identifier. The DCD describes a downlink burst profile applied to a current MAP. The downlink burst profile refers to the characteristic of a downlink PHY channel. The DCD is periodically transmitted by a base station through the DCD message. The UL-MAP is a region where a UL-MAP message is transmitted. The UL-MAP message defines access to an uplink channel. The UL-MAP message includes a configuration change count of an uplink channel descriptor (UCD) and a valid start time of uplink assignment, which is defined by the UL-MAP. The UCD describes an uplink burst profile. The uplink burst profile refers to the characteristic of an uplink PHY channel. The UCD is periodically transmitted by a base station through the UCD message.

In part of a uplink frame is included a fast feedback region. The fast feedback region is a region allocated for faster uplink transmission than transmission of general uplink data and can have a CQI, ACK/NACK signals, etc. loaded thereon. The fast feedback region may be placed anywhere in an uplink frame, but is not limited to an illustrated location or size.

Hereinafter, a slot is a minimum possible data allocation unit and is defined by the time and subchannel. In the uplink, a subchannel can be constructed of a plurality of tiles. The subchannel is constructed of six tiles. In the uplink, one burst can be constructed of three OFDM symbols and one subchannel. In partial usage of subchannel (PUSC) permutation, each tile can include four contiguous subcarriers on three OFDM symbols. In optional PUSC permutation, each tile can include three contiguous subcarriers on three OFDM symbols. Tiles included in the subchannel are distributed and disposed over the entire bands. A bin includes nine contiguous subcarriers on the OFDM symbol. A band refers to a group of four rows of bins and an adaptive modulation and coding (AMC) subchannel is constructed of six contiguous bins in the same band.

Figure 4:
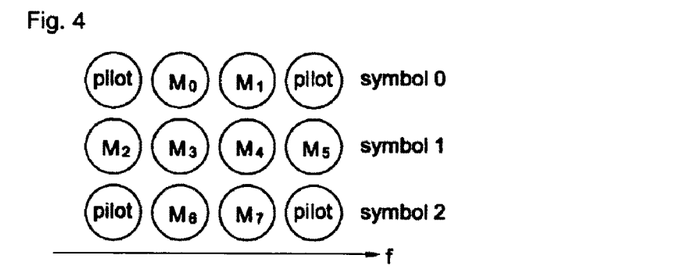
FIG. 4 shows an example of a tile, which is a tile in PUSC.

FIG. 4 shows an example of a tile, which is a tile in PUSC.

Referring to FIG. 4, one tile is constructed of four subcarriers in frequency domain and three OFDM symbols (symbols 0 to symbol 2) in time domain, resulting in a total of twelve subcarriers. The twelve subcarriers can be divided into eight data subcarriers $M_0, \ldots, M_7$ and four pilot subcarriers.

Figure 5:
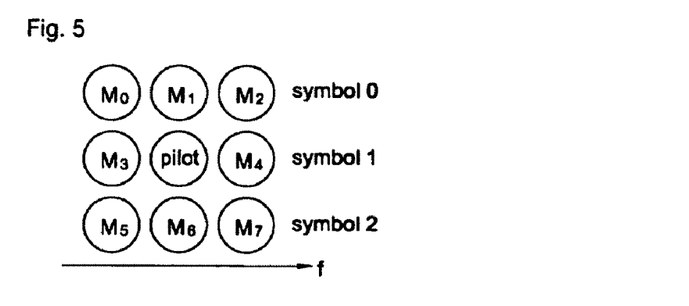
FIG. 5 shows another example of a tile, which is a tile in optional PUSC.

FIG. 5 shows another example of a tile, which is a tile in optional PUSC.

Referring to FIG. 5, one tile is constructed of three subcarriers in frequency domain and three OFDM symbols (symbol 0 to symbol 2) in time domain, resulting in a total of nine subcarriers. The nine subcarriers can be divided into eight data subcarriers $M_0, \ldots, M_7$ and one pilot subcarrier.

Figure 6:
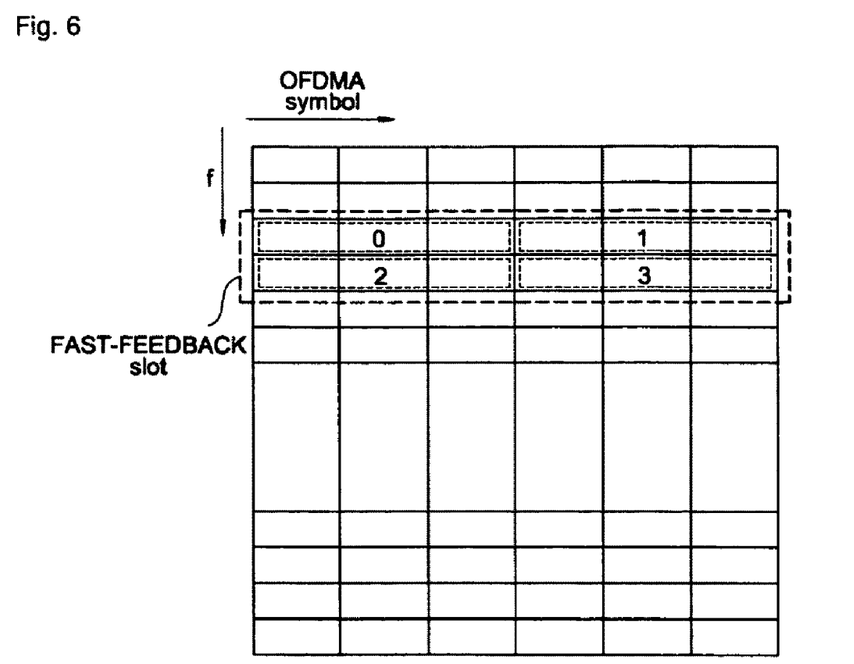
FIG. 6 shows an example of a fast feedback region shown in FIG. 3.

FIG. 6 shows an example of the fast feedback region shown in FIG. 3.

Referring to FIG. 6, the fast feedback message is mapped to the fast feedback region. One fast feedback message can occupy one fast feedback slot. This drawing illustrates that four subchannels are allocated to one fast feedback slot.

One subchannel can include a plurality of tiles. In order to clarity description, it is assumed that one subchannel includes six tiles. When one tile is constructed of PUSC, that is, the form of FIG. 4, one subchannel includes 48 data subcarriers and 24 pilot subcarriers. When one tile includes optional PUSC, that is, the form of FIG. 5, one subchannel includes 48 data subcarriers and six pilot subcarriers.

A method of transmitting the CQI through the fast feedback slot is described below. In order to clarity description, it is assumed that one of the four subchannels constituting the fast feedback slot is allocated to one CQI channel.

In an embodiment, the CQI can be mapped to the data subcarrier of each tile. Table 3 lists modulation symbols assigned to eight data subcarriers included in one tile. The modulation symbol is modulated to one subcarrier, and eight modulation symbols assigned to one tile constitute one vector. A total of eight types of the vectors are constructed and indices thereof have the values of 0 to 7.

TABLE 3

| Vector index | Data subcarrier modulation per Codeword-Subcarrier(0), Subcarrier(1), . . . Subcarrier(7) |
|---|---|
| 0 | P0, P1, P2, P3, P0, P1, P2, P3 |
| 1 | P0, P3, P2, P1, P0, P3, P2, P1 |
| 2 | P0, P0, P1, P1, P2, P2, P3, P3 |
| 3 | P0, P0, P3, P3, P2, P2, P1, P1 |
| 4 | P0, P0, P0, P0, P0, P0, P0, P0 |
| 5 | P0, P2, P0, P2, P0, P2, P0, P2 |
| 6 | P0, P2, P0, P2, P2, P0, P2, P0 |
| 7 | P0, P2, P2, P0, P2, P0, P0, P2 |

Here, the modulation symbols constituting each vector is expressed in the following equation 1.

Math Figure 1

$$P0 = \exp\left(j \cdot \frac{\pi}{4}\right)$$
$$P1 = \exp\left(j \cdot \frac{3\pi}{4}\right)$$
$$P2 = \exp\left(-j \cdot \frac{3\pi}{4}\right)$$
$$P3 = \exp\left(-j \cdot \frac{\pi}{4}\right)$$

[Math. 1]

At this time, the vectors having different indices are orthogonal to each other.

Assuming that a payload indicating the CQI is 4 bits, the vectors assigned to the CQI channel can be expressed in the following Table 4.

TABLE 4

| 4 bit payload | Fast-feedback vector indices per TileTile(0), Tile(1), . . . , Tile(5) |
|---|---|
| 0b0000 | 0, 0, 0, 0, 0, 0 |
| 0b0001 | 1, 1, 1, 1, 1, 1 |
| 0b0010 | 2, 2, 2, 2, 2, 2 |
| 0b0011 | 3, 3, 3, 3, 3, 3 |
| 0b0100 | 4, 4, 4, 4, 4, 4 |
| 0b0101 | 5, 5, 5, 5, 5, 5 |
| 0b0110 | 6, 6, 6, 6, 6, 6 |
| 0b0111 | 7, 7, 7, 7, 7, 7 |
| 0b1000 | 0, 1, 2, 3, 4, 5 |
| 0b1001 | 1, 2, 3, 4, 5, 6 |
| 0b1010 | 2, 3, 4, 5, 6, 7 |
| 0b1011 | 3, 4, 5, 6, 7, 0 |
| 0b1100 | 4, 5, 6, 7, 0, 1 |
| 0b1101 | 5, 6, 7, 0, 1, 2 |
| 0b1110 | 6, 7, 0, 1, 2, 3 |
| 0b1111 | 7, 0, 1, 2, 3, 4 |

One CQI channel includes six tiles because one subchannel is allocated to the CQI channel. Six vectors are necessary to represent the CQI because one vector is assigned to represent one tile. A CQI, which is mapped to a subchannel and represented in the vector form, is called the codeword of the CQI.

Table 4 illustrates an example of a combination of vectors per payload. However, there is no limit to the combination of the vectors, which can be easily modified by those having ordinary skill in the art.

For example, it is assumed that the CQI value is 3. If it sought to represent 3 as 4 bits, 3 becomes 'b0011'. In Table 4, the vector index of 'b0011' is {3,3,3,3,3,3}. A mobile station modulates the vectors of the index 3 of Table 4 to the data subcarriers, included in six tiles constituting one subchannel, respectively, and transmits the modulated subcarriers to a base station through a fast feedback slot. The base station extracts the vectors from the fast feedback slot and obtains vector indices. The bit representation '0b0011' of a corresponding CQI can be found from the obtained vector indices in a reverse manner. A pilot or a null symbol may be assigned to the pilot subcarrier included in the tile.

However, the combination of the vectors per index of Table 3 and the vectors depending on the CQI values of Table 4 is only illustrative. Those having ordinary skill in the art can arbitrarily decide the number of the vector indices or the size of the payload.

In another embodiment, the CQI can be mapped to pilot subcarriers of a tile. Table 5 illustrates four modulation symbols included in one tile (Referring to FIG. 4, there are four pilot subcarriers in one tile in PUSC). The four modulation symbols assigned to one tile constitute one vector and four types of vectors can be constructed.

TABLE 5

| Vector index | $M_{n, 4m}, M_{n, 4m+1}, M_{n, 4m+2}, M_{n, 4m+3}$ |
|---|---|
| 0 | P0, P0, P0, P0 |
| 1 | P0, P2, P0, P2 |
| 2 | P0, P1, P2, P3 |
| 3 | P1, P0, P3, P2 |

The modulation symbols P0, P1, P2, and P3 constituting the respective vectors are expressed in the above Equation 1.

Assuming that the payload for a CQI is 4 bits, the vectors assigned to the CQI channel can be expressed in the following Table 6.

TABLE 6

| Four-bit payload(binary) | Vector indices per tile Tile(0), Tile(1), Tile(2), Tile(3), Tile(4), Tile(5) |
|---|---|
| 0000 | 0, 0, 0, 1, 1, 1 |
| 0001 | 1, 1, 1, 0, 0, 0 |
| 0010 | 2, 2, 2, 3, 3, 3 |
| 0011 | 3, 3, 3, 2, 2, 2 |
| 0100 | 0, 1, 2, 3, 0, 1 |
| 0101 | 1, 2, 3, 0, 1, 3 |
| 0110 | 2, 3, 0, 1, 2, 3 |
| 0111 | 3, 0, 1, 2, 3, 0 |
| 1000 | 0, 0, 1, 3, 2, 2 |
| 1001 | 1, 3, 2, 2, 3, 1 |
| 1100 | 2, 2, 3, 1, 0, 0 |
| 1110 | 3, 3, 1, 0, 1, 1 |
| 1100 | 0, 0, 3, 2, 0, 3 |
| 1101 | 1, 2, 0, 2, 2, 0 |
| 1110 | 2, 1, 3, 3, 1, 2 |
| 1111 | 3, 2, 2, 1, 1, 2 |

The CQI channel is assigned to one subchannel, so one CQI channel includes six tiles. One vector is assigned to represent one tile and therefore six vectors are necessary to represent the CQI.

In still another example, the CQI can be mapped to both the data subcarriers and the pilot subcarriers in each tile. That is, Table 4 shows an example in which the CQI is mapped to the data subcarriers of the tile, and Table 6 shows an example in which the CQI is mapped to the pilot subcarriers of the tile. However, the CQI can be mapped to both the data subcarriers and the pilot subcarriers.

As described above, the CQI channel can be assigned to the fast feedback channel and then carries CQIs. Phase shift of the CQI is now described.

The modulation symbols constituting the vectors for representing the CQI is shown in Equation 1. In order to shift the phase of the CQI, each modulation symbol is multiplied by the phase shift value. This can be expressed in the following equation 2:

MathFigure 2

$$P0_{ps}=P0e^{j\theta}, P1_{ps}=P1e^{j\theta}$$

$$P2_{ps}=P2e^{j\theta}, P3_{ps}=P3e^{j\theta} \qquad [\text{Math.2}]$$

where θ is the phase shift value. For example, in order to shift the phase of a CQI as much as the phase shift value θ=π/4, each modulation symbol is multiplied by exp(jπ/4).

When the mobile station wants to transmit a radio resource allocation request, the mobile station constructs a CQI by multiplying a modulation symbol by a phase shift value and then transmits the constructed CQI through the CQI channel. Disregarding noise, a receiving signal y received by a base station can be expressed in the following equation 3:

MathFigure 3

$$y=HC_0E \qquad [\text{Math.3}]$$

where $C_0$ is the codeword of a CQI, E is phase shift and H is the channel.

In coherent detection, respective tiles are distributed over the entire bands. The base station can obtain the value of a channel H through channel estimation. When compensating for the channel H in the receiving signal y, $C_0E$ can be found. Assuming that the payload of a CQI is 4 bits, a total of 16 types of codewords exist. If the correlation values for all the 16 types of codewords is found, a codeword having the highest correlation value can be found, which becomes $C_0$. This is because vectors with different indices are orthogonal to each other and the orthogonality remains intact although the same phase shift value is used. Since E can be found through $C_0$, the base station can detect whether phase shift exists from a receiving signal. If phase shift exists in a CQI, the base station can find that the mobile station having transmitted a corresponding CQI requests radio resources.

In non-coherent detection, the base station does not perform channel estimation and therefore does not know the value of the channel H. However, it can be seen that one tile is not large in size on the time and frequency and a channel change within one tile is constant. The eight kinds of vectors can be mapped to one tile as listed in Table 3. Thus, an index of a vector having the highest correlation value can be found by correlating respective vectors. In this manner, the indices of six vectors having the highest correlation values can be found sequentially with respect to the six tiles constituting a subchannel. The closest codeword $C_0$ can be found by comparing the sequence of the indices of the six vectors to the sequence of Table 4. Consequently, a CQI can be detected. If $C_0$ is found, whether the phase of the CQI has been shifted can be detected. If there is a phase shift in the CQI, the base station can find that the mobile station that having transmitted a corresponding CQI requests radio resources. In addition to the above detection methods, other coherent and non-coherent detection methods may exist.

The process of allowing the mobile station to request the base station to allocate radio resources is a pre-step for performing uplink transmission. This process is performed through a random access process in UMTS (Universal Mobile Telecommunications System) and is performed through a ranging process in IEEE (Institute of Electrical and Electronics Engineers) 802.16 standard. The random access process and the ranging process are a contention-based process.

The random access process is described as an example. In order to be allocated uplink radio resources, a mobile station selects one access slot and one signature and transmits a preamble to through the uplink. The preamble can be transmitted during an access slot section of 1.33 ms in length. During a first specific length of the access slot, one of 16 kinds of signatures can be selected and then transmitted. If the mobile station transmits the preamble, a base station transmits a signature selected by the preamble during the first specific length of the access slot, which corresponds to the access slot during which the preamble has been transmitted, in response thereto. If a response to the transmitted preamble is not received, the mobile station transmits a new preamble using power, which is higher one step than that of a previous preamble after a predetermined access slot. If a plurality of user equipments perform the random access process at the same time, they can select and send the same signature. Thus, this process is called the contention-based process.

The ranging process is described as an example. A mobile station sends a ranging request message including a CDMA code. A mobile station arbitrarily selects a ranging slot within a backoff window included in a UCD and selects the CDMA code from a series of allowed codes. A pseudo-random bit sequence (PRBS) binary phase shift keying (BPSK) code can be used as the CDMA code. For example, the CDMA codes may be 288 in number, a part of which is used for a bandwidth allocation request. The 288 CDMA codes are trisected; the first codes can be used for initial ranging for the purpose of timing offset and power level control upon initial access, the second codes can be used for periodical ranging for the purpose of periodical power level control, and the third codes can be used for a radio resource allocation request. Mobile stations that transmit ranging request messages through the same ranging slot on the same time are in a contention state. The base station sends a ranging response message in response to the ranging request message.

The random access process or the ranging process is a contention-based process. Hence, a probability that the mobile station will succeed in the contention at once is not high. If the mobile station transmits messages several times, overhead of control signaling is increased. Thus, if the radio resource allocation request is transmitted through the CQI channel that periodically carries CQIs, the consumption of radio resources can be prevented without the loss of the CQI channel. Further, a base station can directly determine a mobile station that has requested radio resources allocation, so there is no contention. The power of a mobile station can also be saved because it is not necessary to send a plurality of random access requests or ranging requests.

Figure 7:
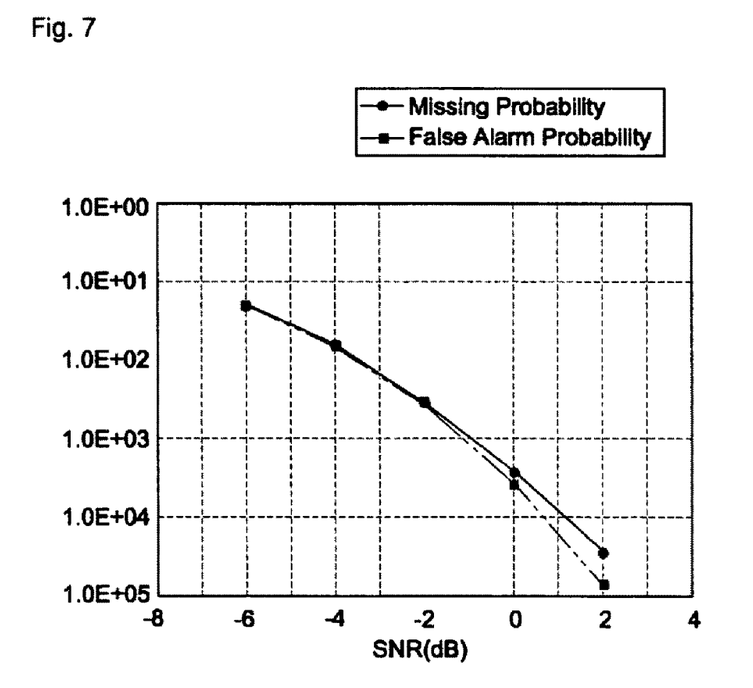
FIG. 7 is a graph showing the simulation results regarding a radio resource allocation request using a phase shift of a CQI.

FIG. 7 is a graph showing the simulation results regarding a radio resource allocation request using a phase shift of a CQI. A missing probability is a probability that a mobile station makes a radio resource allocation request using phase modulation of a CQI, but a base station does not notice the radio resource allocation request. A false alarm probability is a probability that a mobile station doesn't make a radio resource allocation request, but a base station determines that there is a radio resource allocation request.

Referring to FIG. 7, the higher SNR, and the lower the missing probability and the false alarm probability. Further, the missing probability and the false alarm probability are low as a whole. Thus, It is determined that a base station can recognize a radio resource allocation request successfully although a mobile station transmits a radio resource allocation request using phase shift of a CQI.

Figure 8:
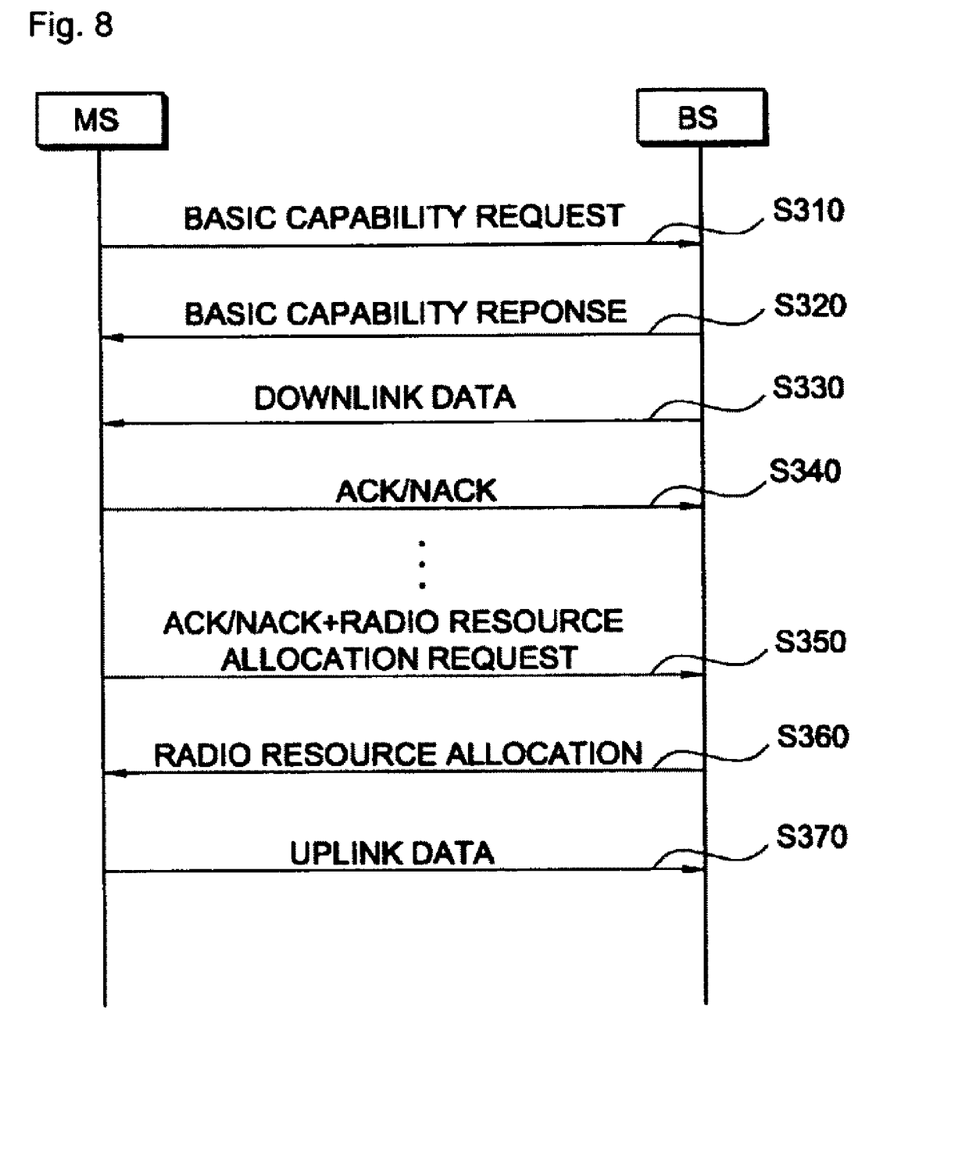
FIG. 8 is a flowchart illustrating a data transmission method in accordance with another embodiment of the present invention.

FIG. 8 is a flowchart illustrating a data transmission method in accordance with another embodiment of the present invention. This illustrates a data transmission method using a hybrid automatic repeat request (HARQ) scheme.

Referring to FIG. 8, a mobile station transmits a basic capability request to a base station (S310). Examples of uplink control channel support included in the basic capability request can include those listed in Table 1 or Table 2.

The base station transmits a basic capability response to the mobile station (S320). A capability negotiation is performed between the mobile station and the base station through the basic capability request and the basic capability response. A capability that is 'on' both in the basic capability request and the basic capability response is applied to communication between the mobile station and the base station. For example, when 'Phase shifted BW request' of the bit #3 is set to 'on' in Table 1, a radio resource allocation request using the phase shift of a control signal is applied.

If a multiplexing indicator becomes 'on' in the capability negotiation between the mobile station and the base station, that is, 'Phase shifted BW request' is applied, an ACK/NACK signal is phase-shifted and the radio resource allocation request is indicated. In other words, assuming that the ACK/NACK signal is a first control signal and the radio resource allocation request is a second control signal, the second control signal is multiplexed in the first control signal and then transmitted. The first control signal can become an ACK/NACK signal, a CQI, MIMO feedback information or the like. The first control signal and the second control signal can be applied by combining a variety of control signals.

The base station sends downlink data (S330). A mobile station receives the downlink data and decodes the data in order to detect error. The mobile station sends an ACK signal when error is not detected, but sends an NACK signal when error is detected (S340). A channel through which the ACK/NACK signals are transmitted is called an ACK/NACK channel. The ACK/NACK channel can be assigned a 1/2 subchannel.

Table 7 lists eight modulation symbols assigned to one tile used in the ACK/NACK channel. Eight modulation symbols assigned to one tile constitute one vector. Eight kinds of vectors can be constituted.

TABLE 7

| Vector index | $M_{n,\ m8}, M_{n,\ 8m+1}, \ldots M_{n,\ 8m+7}$ |
|---|---|
| 0 | P0, P1, P2, P3, P0, P1, P2, P3 |
| 1 | P0, P3, P2, P1, P0, P3, P2, P1 |
| 2 | P0, P0, P1, P1, P2, P2, P3, P3 |
| 3 | P0, P0, P3, P3, P2, P2, P1, P1 |
| 4 | P0, P0, P0, P0, P0, P0, P0, P0 |
| 5 | P0, P2, P0, P2, P0, P2, P0, P2 |
| 6 | P0, P2, P0, P2, P2, P0, P2, P0 |
| 7 | P0, P2, P2, P0, P2, P0, P0, P2 |

The modulation symbol P0, P1, P2, and P3 constituting the respective vectors are expressed in Equation 1.

Assuming that a payload for ACK/NACK is 1 bit (for example, when the bit is 0, it is ACK, but when the bit is 1, it is NACK), the vectors assigned to the ACK/NACK channel can be expressed in the following Table 8. The ACK/NACK channel is assigned a 1/2 subchannel and, therefore, one ACK/NACK channel includes three tiles. Since one vector is assigned to one tile, three vectors are required to represent ACK/NACK.

TABLE 8

| ACK 1-bit symbol | Vector indices per TileTile(0), Tile(1), Tile(2) |
|---|---|
| 0 | 0, 0, 0 |
| 1 | 4, 7, 2 |

If an ACK signal is received in response to the downlink data, the base station transmits next downlink data. However, if a NACK signal is received, the base station retransmits retransmission data. The retransmission data can be identical to or different from the original downlink data depending on the HARQ scheme. The base station can attempt retransmission during a predetermined number of times.

In order to request radio resource allocation, the mobile station shifts the phase of the ACK/NACK signal and transmits the phase shifted signal to the base station through the ACK/NACK channel (S350). This is performed when 'Phase shifted BW request' of the bit #3 in Table 1 or the bit #7 in Table 2 is 'on' in the capability negotiation. In order for the mobile station to transmit a user signal through the uplink, it must be allocated uplink radio resources from the base station. When transmitting the ACK/NACK signal, the mobile station shifts the phases of the ACK/NACK signal and multiplexes radio resource allocation requests. In other words, assuming that the ACK/NACK signal is a first control signal and the radio resource allocation request is a second control signal, the mobile station multiplexes the first control signal and the second control signal. The ACK/NACK channel carries an actual ACK/NACK value and radio resource allocation request information using the phase-shifted ACK/NACK signal.

The base station detects the ACK/NACK signal from the ACK/NACK channel and the radio resource allocation request, and allocates radio resources to the mobile station (S360). The mobile station to which the radio resources are allocated transmits uplink data using the radio resources (S370).

The radio resource allocation request is multiplexed by shifting the phase of the ACK/NACK signal transmitted through the ACK/NACK channel. Accordingly, a control channel for an additional radio resource allocation request is not required, thereby reducing control signaling.

Although the downlink HARQ scheme has been described above, the technical spirit of the present invention can also be applied to the uplink HARQ scheme without change.

It has been described that the CQI and the radio resource allocation request are multiplexed to the CQI channel and the ACK/NACK signal and the radio resource allocation request are multiplexed to the ACK/NACK channel. However, this is only illustrative and a plurality of control signals can be multiplexed and transmitted through one channel. For example, the CQI and the ACK/NACK signal can be multiplexed. That is, in the capability negotiation between the mobile station and the base station, when the multiplexing indicator is set to 'Phase shifted ACK/NACK' and it becomes 'on', the ACK/NACK signal can be multiplexed in the CQI and transmitted. Alternatively, the radio resource allocation request can be multiplexed to multiple input multiple output (MIMO) feedback information.

Various kinds of control signals can be multiplexed by using different phase shift values. For example, when a phase shift is four steps, a 2-bit control signal can be multiplexed. That is, a 2-bit control signal can be represented depending on a phase shift value by setting the phase shift value to π/4, π/2, 3π/4 or π. The range and number of the phase shift value can be applied in various ways depending on a multiplexed control signal.

Every function as described above can be performed by a processor such as a micro-processor based on software coded to perform such function, a program code, etc., a controller, a micro-controller, an ASIC (Application Specific Integrated Circuit), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

The invention claimed is:

1. A method of transmitting control signals in a wireless communication system, the method comprising:
transmitting a basic capability request to a base station, the basic capability request including information on an uplink control channel support indicating a type of a control channel supported in uplink transmission, the information on the uplink control channel support including a multiplexing indicator indicating whether a plurality of control signals are multiplexed on the control channel or not, a size of the multiplexing indicator being one;
receiving a basic capability response corresponding to the basic capability request from the base station, the basic capability response including the approval of the multiplexing indicator;
shifting a phase of a control signal by multiplying a phase shift value to the control signal when a value of the multiplexing indicator is 1; and
transmitting the multiplexed control signal on the control channel.

2. The method of claim 1, wherein the control channel is a fast feedback channel.

3. The method of claim 2, wherein the fast feedback channel includes a plurality of tiles, and each tile is composed of data subcarriers and at least one pilot subcarrier.

4. The method of claim 1, wherein the control signal is one of a channel quality indicator (CQI) or an acknowledgement/non-acknowledgement (ACK/NACK) signal.

5. The method of claim 1, wherein the shifting a phase of a control signal comprises:
modulating the control signal to modulation symbols, the control signal corresponding to a plurality of vector indices, each vector index indicating a vector including a plurality of modulation symbols, each modulation symbol being assigned to one subcarrier in a fast feedback channel; and
shifting the phase of a control signal by multiplying the phase shift value to the control signal,
wherein each modulation symbol is one of P0, P1, P2 and P3 as represented in the equations below:

$$P0 = \exp\left(j \cdot \frac{\pi}{4}\right),$$

$$P1 = \exp\left(j \cdot \frac{3\pi}{4}\right),$$

$$P2 = \exp\left(-j \cdot \frac{3\pi}{4}\right),$$

$$P3 = \exp\left(-j \cdot \frac{\pi}{4}\right), \text{ and}$$

wherein the phase-shifted control signal is represented by the equation below:

$$P0_{ps}=P0e^{j\theta}, P1_{ps}=P1e^{j\theta}$$

$$P2_{ps}=P2e^{j\theta}, P3_{ps}=P3e^{j\theta}$$

where $\theta$ is the phase shift value.

6. The method of claim 1, wherein the basic capability request further includes a fast feedback information referring to faster uplink transmission than general uplink data.

7. The method of claim 5, wherein the $\theta$ is $\pi/4$.

8. The method of claim 5, wherein the vectors having different vector indices are orthogonal each other.

9. The method of claim 5, wherein a number of the plurality of vector indices is equal to a number of a plurality of tiles included in the control channel.

* * * * *